United States Patent [19]

Gabriele

[11] Patent Number: 4,917,395

[45] Date of Patent: Apr. 17, 1990

[54] WHEELCHAIR AND METHOD OF MAKING SAME

[76] Inventor: Joseph M. Gabriele, 8416 Carole La., Fenton, Mich. 48430

[21] Appl. No.: 289,167

[22] Filed: Dec. 23, 1988

[51] Int. Cl.⁴ .............................................. B62B 11/00

[52] U.S. Cl. ................................. 280/250.1; 280/647; 280/650; 297/44

[58] Field of Search .................. 280/250.1, 304.1, 650, 280/647; 297/42, 44, DIG. 10

[56] References Cited

U.S. PATENT DOCUMENTS 4,693,490 9/1987 Loodberg et al. .................. 280/650

4,770,432 9/1988 Wagner ............................ 280/250.1

*Primary Examiner*—Mitchell J. Hill

*Attorney, Agent, or Firm*—Dykema Gossett

[57] ABSTRACT

The wheelchair of the present invention is made of a non-metallic material. The wheelchair is made so that it is easily assembled, light weight and less expensive than traditional wheelchairs. The wheelchair employs a unique hinge assembly which provides support for the seat, back and foot rest. By using the hinge assembly, the seat, back and foot rest are selfsupporting because the hinge assembly distributes the forces acting upon these members through the side panels. The hinge members are molded integrally with the seat, back and foot panels. Further, when the side panel of the wheelchair is formed, slots are formed therein for receipt of the hinge member. The same is true of the foot rest. The present invention also employs an improved adjusting mechanism for adjusting the pivotal relationship of the foot rest and an improved brake assembly.

17 Claims, 7 Drawing Sheets

/Fig-1

WHEELCHAIR AND METHOD OF MAKING SAME

BACKGROUND OF THE INVENTION

The present invention relates to foldable chairs, particularly wheelchairs and more particularly to an improved foldable wheelchair of lightweight non-metallic construction.

At present, the major structural components of most foldable wheelchairs are bent metal tubes. These foldable wheelchairs are generally heavy, unattractive in appearance and not sufficiently rugged for everyday use. In applications where the wheelchair must be formed of non-magnetic materials, such as used in Magnetic Resonant Imaging or MRI, non-magnetic stainless steel may be substituted for the steel tubing, substantially increasing the cost and weight of the wheelchair.

In view of these problems, there have been many attempts to design a foldable wheelchair using plastic as the major structural component. For example, U.S. Pat. No. 4,457,535 to Takeuchi, et al. discloses a wheelchair which may be formed primarily of plastic tubing and flexible material webs. Takeuchi employs a pair of yoke members pivotally connected at their lower ends to longitudinal tubular frame members and at their upper ends to a pair of tubular seat members. The intersection of the yoke members are connected for pivotal movement. The seat of the wheelchair is a web of flexible material hung between the tubular seat members. When the chair is folded and unfolded, the yoke members pivot about their pivotal connection in a scissorlike fashion. A disadvantage in this type of wheelchair is the time required to assemble the tubular members.

U.S. Pat. No. 4,770,432 to Wagner assigned to the Assignee of the present application attempts to avoid the disadvantages of tubular construction while still employing the advantages of plastic. The wheelchair employs molded side members and a pair of seat panels and back panels hingedly attached to the side panels. A pair of seat-supporting panels are located below the seat panels with their opposite ends hingedly attached to the side panels and their adjoining ends interconnected by a center hinge. The seat-supporting panels are arranged generally perpendicular to the hinge axis of the seat panels when the wheelchair is unfolded. The major components, including the wheels, seat, and side panels are formed of skinned polymeric foam, such as cast polyurethane foam. The wheelchair of this invention takes advantage of the advances in non-magnetic structural materials, particularly polymeric foam.

Although the Wagner wheelchair has advantages as a non-magnetic wheelchair, there are disadvantages. One of the major disadvantages is its weight. It was believed that the weight of the wheelchair could be maintained between 20 and 25 pounds; however, it was found that it was necessary to make the wheelchair much heavier to obtain adequate strength. Within the weight range of 20 to 25 pounds, the wheelchair was not considered to be strong enough to adequately support an adult. Therefore, further strengthening was required which increased the weight. The weakness of these wheelchairs was due in part to the use of the piano-type hinges which required seat support panels to provide additional support. In order to get adequate strength, the seat support panels had to be increased in size as well as the side panels and seat panels to support the weight of the adult. Further, the piano-type hinges require continued maintenance because they are exposed and susceptible to the accumulation of dirt, etc. Further, there were substantial costs in assembling the wheelchair because the piano-type hinges had to be attached in at least nine different locations. There is also the disadvantage of the piano-type hinges working loose and having to be reconnected and further maintained.

What is needed is a foldable wheelchair employing non-magnetic materials which can be easily assembled, easily maintained and lightweight. Such a wheelchair would have to be simple in construction, rugged, foldable or collapsible and take advantage of the advances in plastic and non-magnetic structural components. The wheelchair of this invention provides such a wheelchair.

SUMMARY OF THE INVENTION

As described, the wheelchair of this invention is particularly although not exclusively, adapted for collapsible or foldable chairs, particularly wheelchairs which may be formed of non-magnetic materials. However, it should be understood that the improvements, which will be described below, are not limited to chairs or wheelchairs and are not limited to the use of non-magnetic materials. For example, the unique hinge assembly and pivotal adjustment mechanisms of the present invention can be used in a wide range of applications. These further applications will become more apparent to those of ordinary skill after reading the disclosure and claims and reviewing the drawings herein.

A primary element of the present invention is the unique hinge means which provides support for the seat, back and foot rest without other supports of any kind being necessary. The hinge means is self-supporting will all forces applied to the hinged member being distributed through the hinge means. Additionally, the hinge means is concealed so that there are no exposed elements. As a result, the hinge means of the present invention requires little, if any, maintenance. Further, the hinge means may be integrally molded with the hinged member reducing both material and labor cost.

In the preferred embodiments, the self-supporting hinge of the present invention is used to hinge the seat and back panels to the wheelchair side panels and the foot rest panels to the vertical adjustable members of the foot rest assembly. Each hinged member, i.e., seat, back or foot rest panel, has a hinge portion along one edge thereof which is received within a complementary hinge slot in the support member, i.e., side panel or vertical adjustable member. The hinge portion includes a semi-circular convex hinge surface, a locking surface and a bearing surface. In the most preferred embodiments, these hinge portion surfaces are generally heart-shaped in cross section.

The complementary slot includes a semi-circular concave socket recess adjacent the opening which receives the semi-circular convex hinge surface, a locking recess for receiving the locking surface of the hinge member and a bearing recess for receiving the bearing surface of the hinge member. The hinge and bearing surfaces and the hinge and bearing recesses cooperate to allow the hinged member to pivot with respect to the support member a predetermined angular movement. When the hinged member has been fully pivoted so that it is substantially perpendicular to the support member, the locking surface engages the locking recess to prevent further relative pivotal movement and to support the hinged member without requiring additional support. Pivotal movement in the opposite direction is limited by the support member with the support member and hinged member being substantially parallel when fully pivoted.

The collapsible chair or wheelchair of this invention includes a pair of spaced side members or panels arranged in generally parallel vertical relation. In a wheelchair, the wheels are rotatably connected to the side panels and support the wheelchair. The seat comprises a pair of seat panels each having a hinged portion extending along one edge thereof located within a horizontal slot of one of the side panels. The opposite sides of the seat panels are pivotally interconnected. The seat panels are supported from the hinge portion and more particularly from the locking surface of the hinge portion.

The back of the wheelchair is made of panels which preferably include the self-supporting hinge assembly on each panel for hinging the back to the side panels of the wheelchair. The adjoining ends of the back panels are hinged together with a hinge that includes a central spine member. The spine member allows the back panels to be folded forwardly toward the front of the wheelchair and creates a predefined space between the side panels when the chair is collapsed. This predefined space is just wide enough for the seat portions to be folded together between the side panels, reducing the width of the folded wheelchair with the side panels in parallel relation.

The foot rests of the preferred embodiment of the wheelchair of this invention also take advantage of the new hinge assembly, while having the additional advantage of adjustability. The foot rests have a pair of panels that have the same hinge portions as the seat and back panels. However, the slot in the support member, i.e., the vertical adjustable member, is formed differently than the slots in the side panels to permit the foot rest to be adjustable longitudinally with respect to the vertical adjustable member. The foot rest assembly has an elongated C-shaped pocket with a backwall, sidewalls and inwardly extending lips. The backwall has a series of longitudinally spaced locking and bearing recesses that extend transversely across the adjustable member for receipt of the hinge portion of the foot rest panels. The locking and bearing surfaces of the foot rest panel hinge members are received within a respective one of the spaced locking and bearing recesses. The hinge surface of the hinge member is received and retained behind the lip portion. In this way, the foot rest can be pivoted counter clockwise or in the direction of the vertical member and adjusted longitudinally with respect to the vertical member, thereby adjusting the height of the foot rest. Each panel is independently adjustable. Further, in the disclosed embodiment, the adjoining edges of the foot rest panels can be interconnected by an elongated socket and ball connection.

The foot rest assembly also includes an improved pivotal adjustment assembly. The pivotal adjustment assembly interconnects the horizontal and vertical members of the foot rest assembly for adjustment of the angular relationship of the vertical member with respect to the horizontal member. A push button means is provided, which when depressed permits relative pivotal movement of the vertical member. As disclosed, the horizontal member has opposed half sides between which the vertical member is sandwiched. One of the half sides has a aperture for receipt of the push button with the other half side having means interconnected to the push button for guiding its movement between engaged and disengaged positions. The push button controls a locking means which engages the one half side of the vertical member to lock the horizontal and vertical members in angular relationship with one another. The other half side has means for receiving the locking means of the push button when the push button is depressed to disengage the locking means to permit pivotal movement of the vertical member with respect to the horizontal member.

The locking means of the pivotal adjustment assembly includes a disk extending from the vertical member which is received between the half sides of the horizontal member. The outer circumference of this disk is serrated. The push button has serrations on its inner and outer diameter with the inner serrations selectively engaging the serrated disk and the outer serrations selectively engaging serrations in the aperature of the horizontal member. When the push button is in its normal position, the serrations are all engaged preventing pivotal movement of the vertical member. When the push button is depressed, the serrations on the push button are received within the receiving means formed in the other half of the horizontal member allowing the vertical member to pivot.

In addition to the foregoing, the wheelchair of the present invention also employs improved hand grips. The hand grips are formed in the side panels adjacent the top rearward corner of the panels. Further, the wheels of the wheelchair are specially formed and mounted to reduce maintenance and to make assembly easier. Still further, the wheelchair employs an improved braking system which is fully concealed and easier to apply by the user of the wheelchair.

The major components of the wheelchair of this invention, including the hinges, seat panels, side panels, etc. may be made of glass impregnated polycarbonate or polypropylene. A molybdenum filler is preferably included in the hubs and axles as a rigidifier and self lubricant. The resilient parts, including the tires and the resilient brake covers are preferably made of a synthetic rubber, such as "Sanoprene" manufactured by Monsanto.

The method of making the wheelchair facilitates easy, inexpensive assembly and greatly reduces the cost of the wheelchair. Each of the side, back and foot rests panels and the hinge portions may be molded integrally as a single unit. Each of the side panels are preferably formed as a single unit with the hinge slot formed by using a plug, expandable insert or by using the hinge portion itself. This latter method requires the hinge portion to be treated with heat resistive coating such as for example tetrafluoroethylene. With any of these methods, the panel can be assembled easily and quickly.

As will be understood, the wheelchair of this invention takes advantage of the advances in non-magnetic structural materials. Further, the novel method of making the wheelchair permits easy inexpensive manufacture and assembly of the wheelchair. Further, the novel hinge assembly reduces the weight of the wheelchair while still providing necessary support because the hinge assembly is self-supporting. Still further, the adjusting assembly provides an improved way of adjusting the foot rests.

Other advantages and meritorious features of the present invention will be understood from the following description of the preferred embodiments, the appended claims and the drawings, a brief description of which follows.

BRIEF DESCRIPTION OF THE DRAWINGS

FIG. 9 is an exploded perspective view of pivot adjustment assembly of the wheelchair of the present invention.

DETAILED DESCRIPTION OF THE INVENTION

Figure 1:
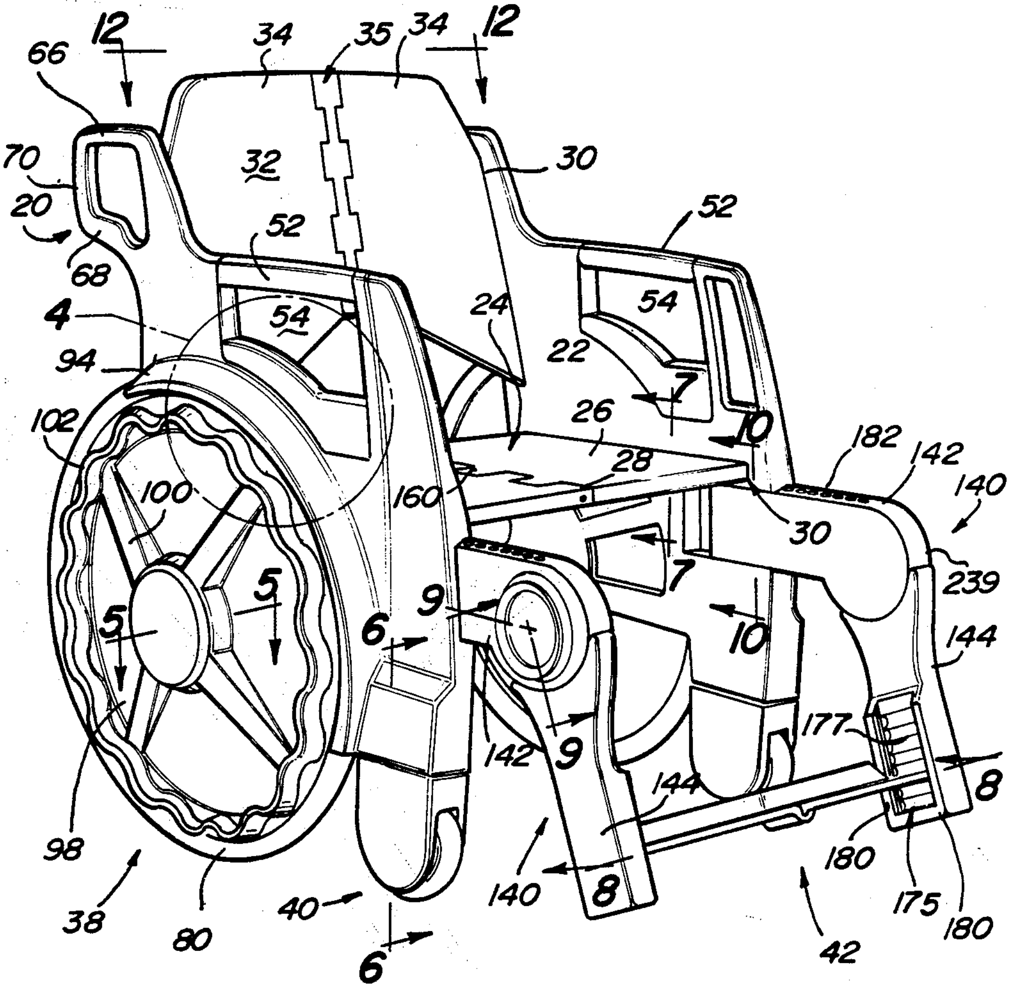
FIG. 1 is a perspective view of a foldable wheelchair of the present invention.

Referring to FIGS. 1-13 and in particular FIG. 1, the preferred embodiment of the wheelchair of the present invention is shown generally at 20. Wheelchair 20 includes side panels 22 which are interconnected by a seat portion 24 and back portion 32. Seat portion 24 includes two separate panels 26 which are hingedly connected at their adjoining ends by a hinge means 28 and hinged at their opposite ends to panels 22 by a hinge assembly 30, see FIG. 7. Hinge assembly 30 will be discussed in greater detail below. The back portion 32 is defined by two hinged panels 34 which are hinged at their adjoining ends by a dual hinge 35 and hinged at their opposite sides to panels 22 by hinge assembly 30. Wheels 38 and casters 40 are connected to side panels 22. Foot support assemblies 42 extend outwardly from the front of each side panel 22. The general construction of the wheelchair, including the hinges, seat panels, side panels etc. may be formed of glass impregnated polycarbonate or polypropylene.

The side panels 22 of the wheelchair are molded as a single unit. This single unit includes hand grips 50, arm rest 52, wheel retainer assembly 58, see FIG. 5, caster wheel assembly 40, see FIG. 6, hinge recesses 62, see FIGS. 7 and 12 and foot support track 64, see FIG. 10. With the formation of each of these during the molding of side panel 22, the corresponding parts can be inserted rapidly to facilitate assembly of the wheelchair. As should be apparent, the parts of the wheelchair can be rapidly snapped into the corresponding recesses.

The hand grips 50 of the wheelchair of the present invention are constructed to facilitate pushing, pulling and lifting of the wheelchair. The upper gripping portion 66 may be conveniently gripped by a tall person or person standing on an elevated surface, such as a curb, a lower gripping portion 68 may be conveniently gripped by a short person or by a person standing on a lower surface, such as when the wheelchair is lifted onto or out of a vehicle. A substantially vertical rearward portion 70 is provided for normal gripping.

Figure 2:
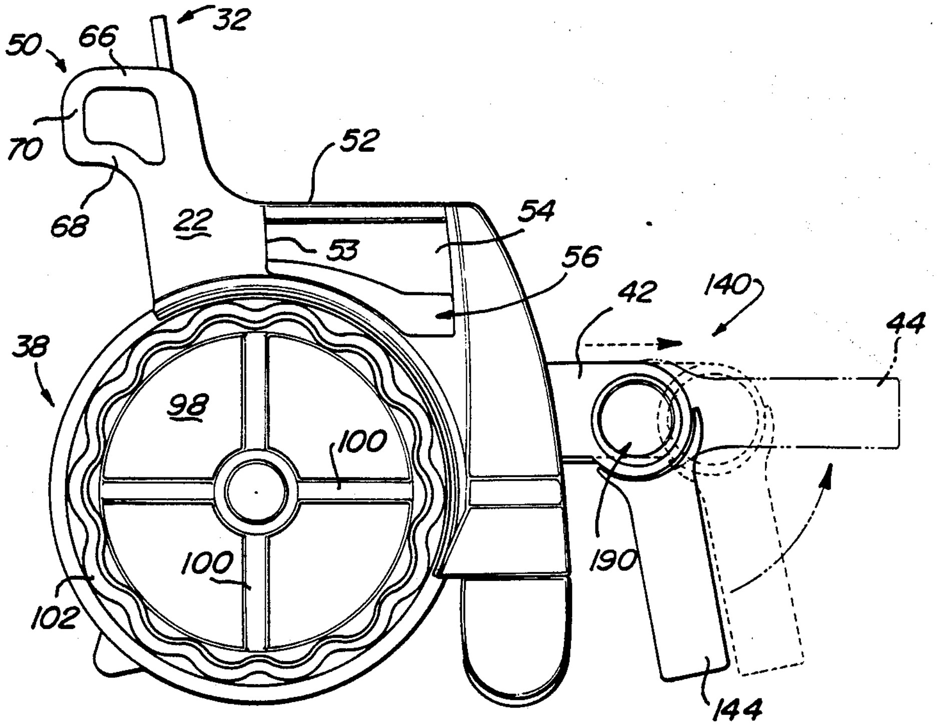
FIG. 2 is a side elevational view of the foldable wheelchair of the present invention in its unfolded condition.
Figure 3:
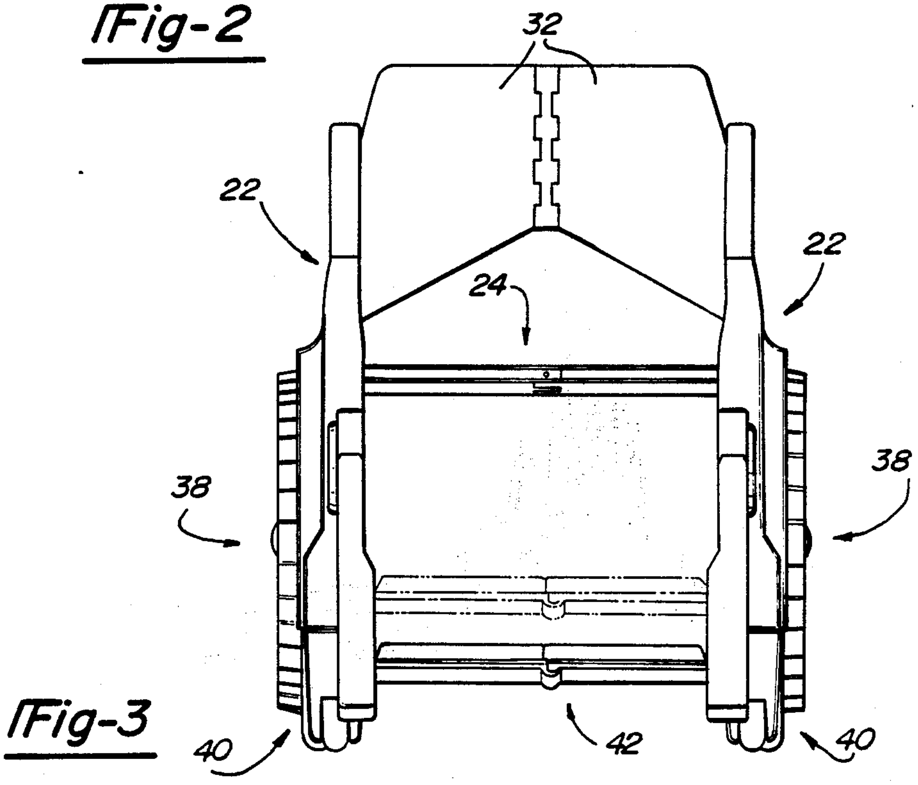
FIG. 3 is a front elevational view of the foldable wheelchair of the present invention.
Figure 4:
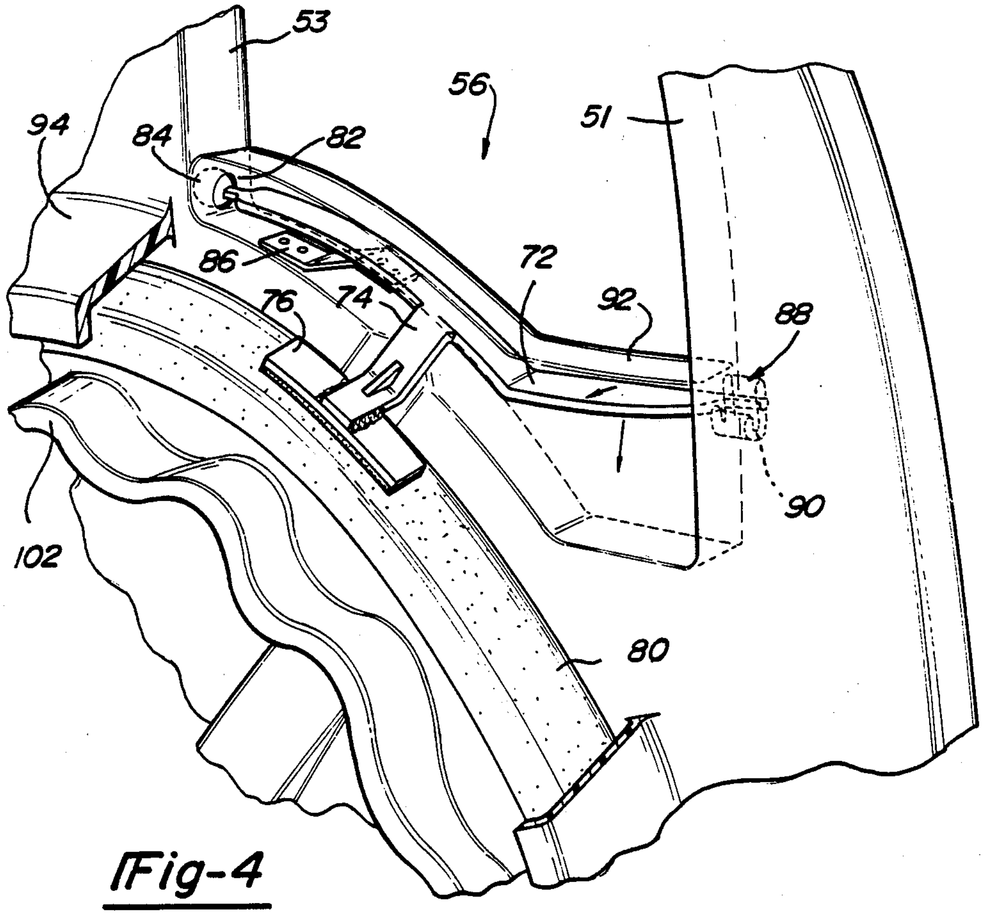
FIG. 4 is a fragmentary perspective view of the foldable wheelchair of the present invention and in particular the improved brake assembly.

With reference to FIGS. 2 and 4, arm rest 52 is supported between a forward member 51 and rearward member 53 which define a cross ventilation opening 54. This ventilation opening provides ventilation to the user of the wheelchair and access to the braking mechanism as described below.

Mounted between forward and rearward members 51 and 53 of armrest 52 is a brake assembly 56. Brake assembly 56 spans cross-ventilation opening 54 so that it is easy for the operator of the wheelchair to apply the brakes. As should be apparent, the user of the wheelchair merely has to insert his hand into opening 54 and with a downward motion apply brake 56. With reference to FIG. 4, the brake includes an actuating arm 72 which has a brake pad arm 74 extending downwardly therefrom ending in a brake pad 76. Brake pad 76 engages tire 80 of wheel assembly 38 to stop the wheelchair.

In the disclosed embodiment, actuating arm 72 has a ball member 82 at one end which is received within a socket 84 formed in rearward member 53. Preferably, this socket 84 is formed at the time panel 22 is formed. The ball and socket arrangement allows actuating arm 72 to be moved in a vertical direction with respect to tire 80. A biasing means 86 is mounted under actuating arm 72 to normally bias brake pad 76 away from tire 80. In the disclosed embodiment, biasing means 86 is a leaf spring which is mounted to panel 22. At the opposite end of actuating arm 72, a stop member 88 is formed which includes a bracket 90. This member 88 controls the amount of downward movement of actuating arm 72. As should be apparent, by pressing actuating arm 72 downwardly, the bias of spring 86 is overcome and brake pad 76 engages tire 80 stopping the wheelchair. Upon release of actuating arm 72, biasing means 86 returns the actuating arm to its normal non-engaged position. To add to the aesthetic appearance of the wheelchair and to protect the brake mechanism, brake assembly 56 is fully enclosed. A flexible boot 92 is positioned over actuating arm 72 and brake pad arm 74 extends into wheel well 94 of side panel 22.

Figure 5:
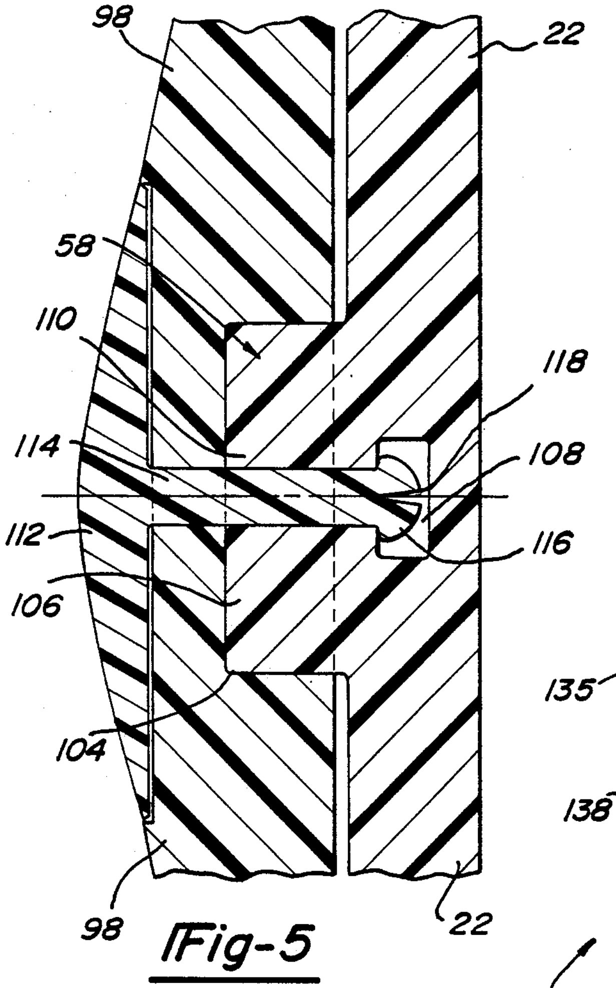
FIG. 5 is a cross-sectional view taken along line 5—5 of FIG. 1. showing the wheel attachment to the side panel.

With reference to FIGS. 1 and 5, wheel assembly 38 of the present invention will be described. The wheel includes a rim 98 which is made from the same material as side panels 22, but in the preferred embodiment is reinforced with a molybdenum filler to add strength. The rim 98 includes spokes 100 which further provide strength to rim 98. Mounted about the outer periphery of the face of rim 98 is a push ring 102 which has a specially configured sinusoidal shape which facilitates pushing of the wheelchair in either direction by the operator. A tire 80, preferably made of "Sanoprene," is mounted to rim 98.

With reference to FIG. 5, the disclosed embodiment of rim 98 includes a recess 104 which fits over a hub 106 that extends outwardly from side panel 22. This hub 106 is integrally formed on panel 22 when panel 22 is molded. In the preferred embodiment, the hub includes a molybdenum filler for strength. A bore 110 extends through hub portion 106 and ends in a T-shaped bore 108. In the disclosed embodiment, a hubcap 112 having a post 114 extending outwardly therefrom is received within this bore 110. Post 114 ends in a mushroom-shape end portion 116 which when fully inserted is received within T-shaped bore 108. The mushroom-shst 114 ends in a mushroom-shape end portion 116 which when fully inserted is received within T-shaped bore 108. The mushroom-shape end 116 has a split 118 that permits end 118 to be compressed in bore 110 while being inserted and to expand outwardly into locking engagement with the walls of the T-shaped bore 108 when fully inserted. Hubcap 112 permits easy snap-on assembly of rim 98 to panel 22. As should be apparent, hubcap 112 could be integrally formed with rim 98 instead of hubcap 112 being a separate member as shown. When assembled, rim 98 rotates about hub 106 with the outer perimeter of hub 106 and recess 104 of rim 98 acting as bearing surfaces.

Figure 6:
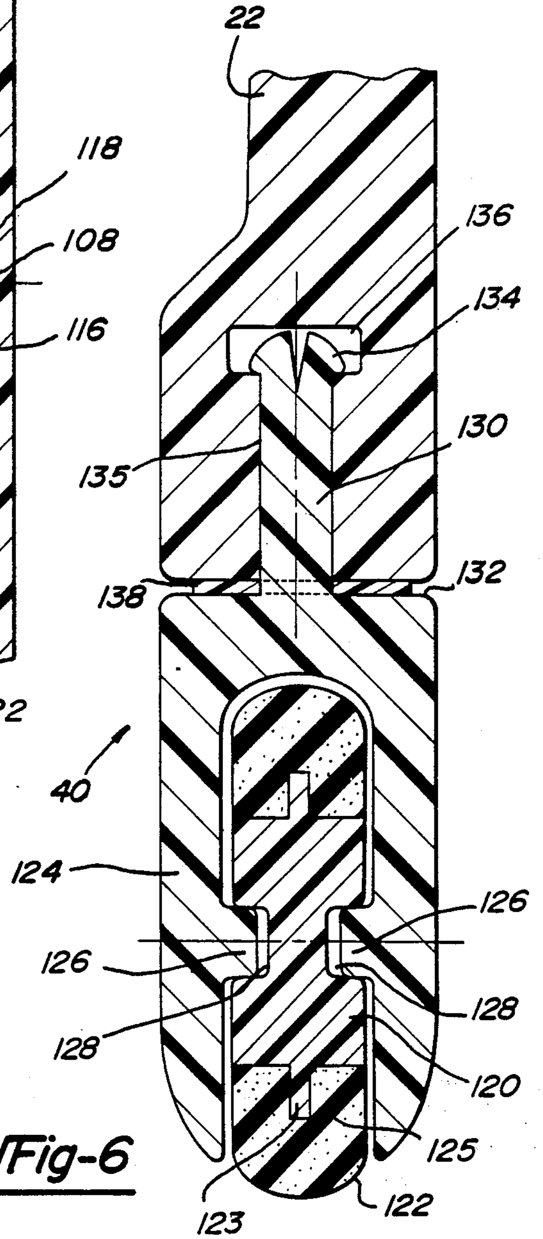
FIG. 6 is a cross-sectional view taken along line 6—6 of FIG. 1 showing attachment of the castor wheel to the side panel.

With reference to FIG. 6, caster wheel assembly 40 will be described. The caster wheel assembly 40 includes a caster wheel 120 about which a tire 122 is mounted. In the preferred embodiment, tire 122 is made of Sanoprene. To facilitate mounting of the Sanoprene tire on caster wheel 120, a rib 123 extends outwardly about the outer periphery of caster wheel 120 for receipt within a recess or slot 125 in tire 122. Although not shown, this same construction is preferably used with Sanoprene tires 80 mounted on rims 98. This construction prevents the tires from slipping off rims 98 or 120.

The caster wheel assembly 40 includes a caster casing 124 which is substantially C-shaped and has opposed hub members 126 extending inwardly. Caster wheel 122 has complimentary recesses 128 formed at about its mid portion which, when the wheel is properly mounted, receive opposed hubs 126. To assemble caster wheel 128 within housing 124, the wheel and tire are merely pushed into hub 124 with the sides of hub 124 expanding outwardly until recesses 128 are aligned with hubs 126. Once aligned, the sides of caster housing 124 return to their normal position and lock caster wheel 120 within housing 124.

Extending from the top of housing 124 is a post 130 which ends in a split mushroom 134. This split mushroom 134 is received within T-shaped slot 136 formed at the base of side portion 22. In the disclosed embodiment, a neoprene washer 138 is mounted between housing 124 and side panel 122 to facilitate rotation of housing 124 with respect to panel 22. To assemble, post 130 is merely inserted into bore 135 until mushroom head 134 opens into locking engagement with slot 136.

Figure 7:
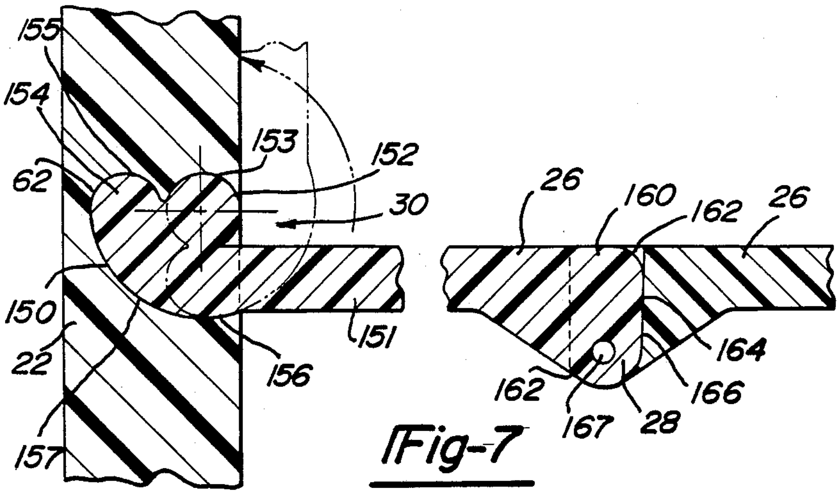
FIG. 7 is a cross-sectional view taken along line 7—7 of FIG. 1 showing a seat panel hinged to the side panel.

Referring to FIG. 7, unique hinge assembly 30 of the present invention will be described. Hinge assembly 30 includes a hinge member 150 which is integrally formed at the end of hinged member 151, which in FIG. 7 is seat panel 26. The hinge member 150 includes a pivot member or surface 152 which is semi-circular in shape. Mounted directly adjacent pivot member 152 is a locking member or surface 154 which, as disclosed, is also semi-circular in shape. It should be understood, that locking member 154 could have a variety of shapes with the semi-circular shape being preferred. Extending downwardly from locking member 154 is an arcuate bearing or arcuate surface 156.

Hinged member 150 is received within a complimentary shaped slot formed in panel 22. This slot has a pivot recess 153 for receipt of pivot member 152, a locking recess 155 for receipt of locking member 154 and a bearing recess 157 for receipt of bearing surface 156. As illustrated in FIG. 7, wheelchair 10 is unfolded with seat panels 26 in their downward most position. In this position, locking member 154 engages the walls of locking recess 155 distributing the forces applied to seat panel 26 along the walls of locking recess 155. The seat panel 26 requires no further support because all of the forces are distributed through recess 155 and transmitted to side panel 22. When the wheelchair is folded, see FIG. 11, seat panels 26 are rotated counter clockwise until they are substantially parallel to side panels 22. When seat panels 26 are rotated, pivot member 152 pivots within pivot recess 153 while bearing surface 156 slides along the surface of bearing recess 157. Due to the configuration of hinged member 150 and the slot formed in panel 22, seat panels 26 cannot be easily or unintentionally removed once they have been inserted.

The adjoining ends of seat panels 26 are connected by a hinge 28. With reference to FIG. 1, hinge 28 includes a plurality of mating teeth 160. In the disclosed embodiment, these teeth have radiused corners at 162 which are joined by a flat surface 164, see FIG. 7. Flat surface 164 abuts flat surface 166 of the opposed panel so that the adjoining ends of panels 126 are in abutting engagement. These flat surfaces provide additional support to seat panels 26 when the wheelchair is supporting an occupant. The adjoining panels 26, due to flat surfaces 164 and 166, lock against each other to prevent panels 126 from rotating any further in the downward direction. This added locking mechanism is an addition to locking member 154. However, it should be understood that locking member 154 is sufficient in and of itself to support panels 26 without the additional support provided by hinge member 28. The hinged member 28 includes a pin 167 which in the preferred embodiment is made of a nonmetallic material such as for example, glass.

Figures 8A, 9A:
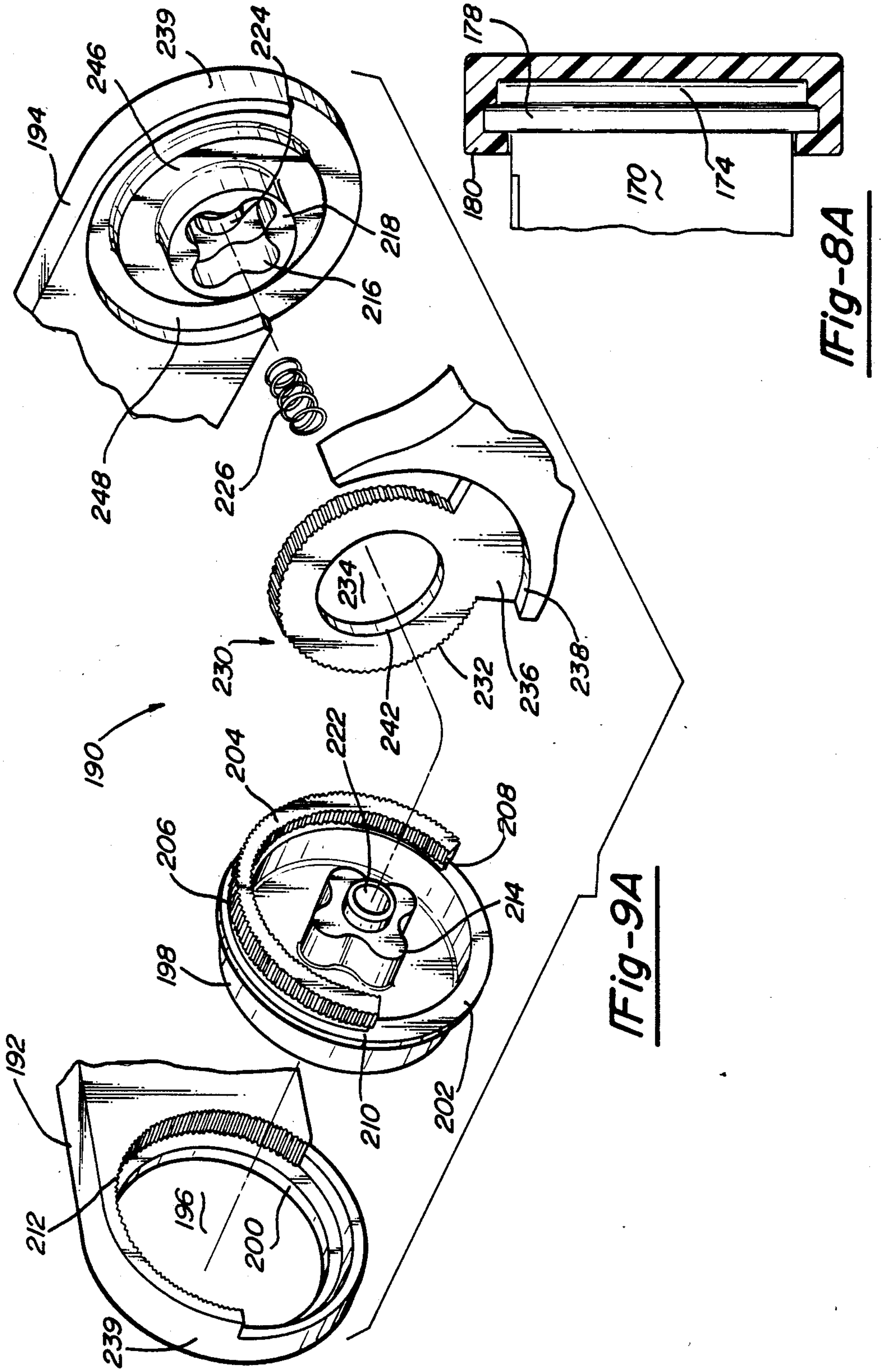
FIG. 8*a* is a cross-sectional view taken along line 8*a* of FIG. 8.
Figure 8:
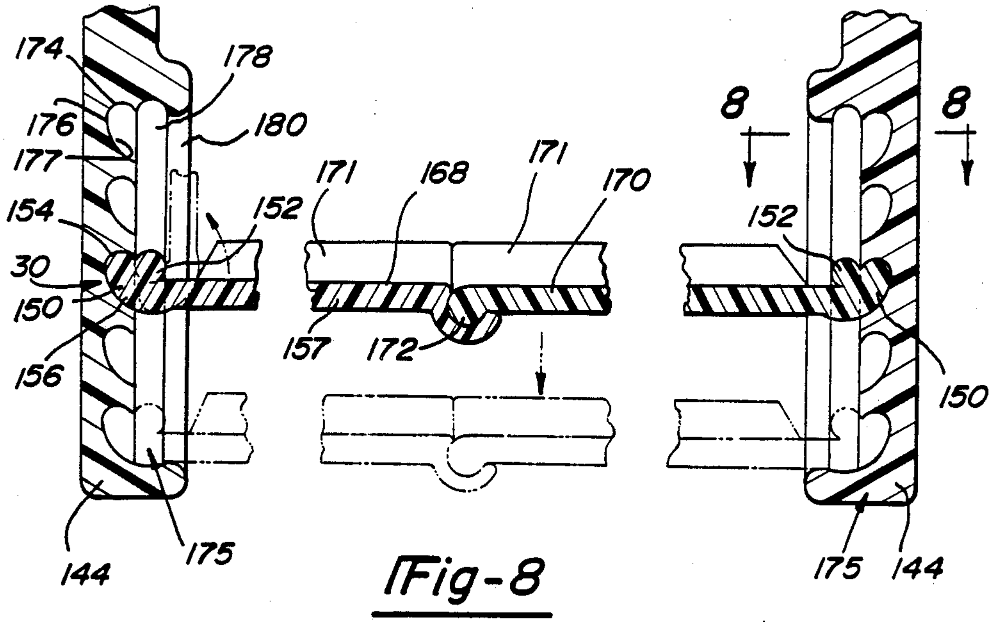
FIG. 8 is a cross-sectional view taken along line 8—8 of FIG. 1 showing the foot rest panels hinged to the foot rest vertical supports.

With reference to FIG. 8, a cut-away view of foot support assembly 42 is illustrated. Foot support assembly 42 includes panels 168 and 170. In the preferred embodiment, the opposed ends of panels 168 and 170 employ the unique hinge assembly 30 of the present invention. In the disclosed embodiment, foot pads 171 are mounted to the tops of panels 168 and 170 for the comfort of the user. The adjoining ends of panels 168 and 170 are interconnected by a ball and socket joint 172. The ball and socket joint is elongated as can be seen in FIG. 1.

With reference to FIGS. 1 and 8, foot support assembly 42 includes spaced foot rest extensions 140 which extend from side panels 22. The extensions include a horizontal adjustable member 142 which is received within a support track 64, see FIG. 10, and a vertical adjustable member 144 which is pivotally connected to horizontal member 142. Mounted at the lowermost portion of vertical adjustable member 144 are foot rest panels 168 and 170.

The opposite ends of panels 168 and 170 are mounted within elongated C-shape receptacles 175. The panels 168 and 170 are mounted within these C-shaped receptacles 175 so that they can be adjusted longitudinally with respect to vertical members 144. Each C-shape receptacle 175 has a back wall 177, side walls 178 and a lip portion 180. With reference to FIG. 8, back wall 177 has an arcuate, semi-circular shaped recess or wall 174 which ends in an arcuate recess or surface 176. Recesses 174 and 176 correspond to locking surface 155 and bearing surface 157 illustrated in FIG. 7. The locking member 154 and arcuate surface 156 of hinge member 150 are received within these recesses 174 and 176 as illustrated in FIG. 8. The pivot member 152 is mounted behind lip portion 180 which retains hinge member 150 within C-shaped receptacle 175. In this way, panels 168 and 170 can be independently rotated in the counter-clockwise direction until they are substantially parallel with members 144 and then adjusted longitudinally with respect to members 144 to adjust the height of foot panels 168 and 170. This is possible because pivot and locking surfaces 152 and 154 are within guide track 178 formed between backwall 177 and lip 180. When panels 168 and 170 are fully rotated in the clockwise position, they are locked in place by locking member 154.

Figure 10:
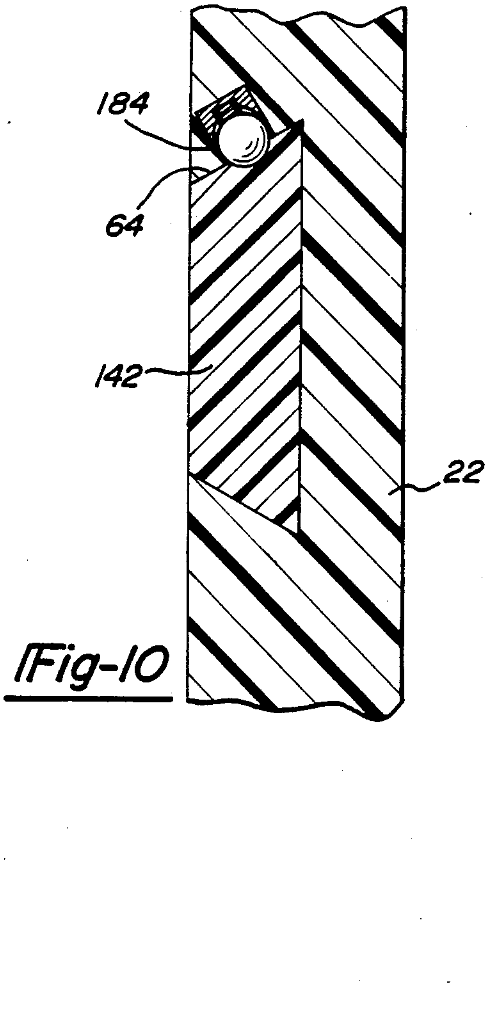
FIG. 10 is a cross-sectional view taken along line 10—10 of FIG. 1.
Figure 11:
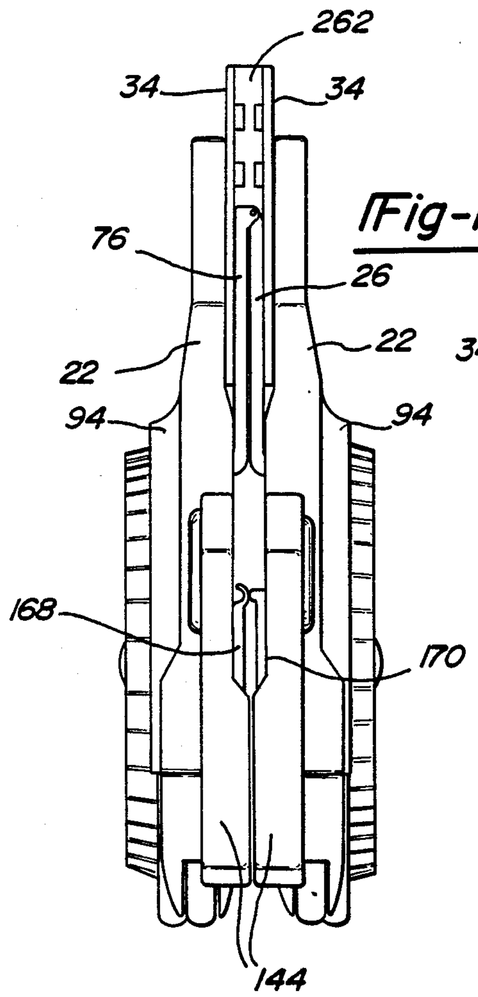
FIG. 11 is a front elevational view of the foldable wheelchair of the present invention in its folded condition.

With reference to FIG. 10, horizontal member 142 of foot support assembly 42 is received within track 64 formed in side panel 22. This track includes a spring loaded ball, or velier button, which engages a plurality of detents 182 formed in the upper surface of horizontal member 142. In this way, horizontal member 142 is adjustable with respect to side panels 22.

With reference to FIG. 9, pivotal adjustment mechanism 190 of the present invention will be described. The horizontal member 142 is divided into first and second halves 192 and 194. Half member 192 has an aperture 196 extending through its free end for receipt of a push button member 198. Preferably, aperture 196 is countersunk so that it has a lip portion 200 which engages a rim 202 on push button 198 to retain button 198 within aperture 196. Push button 198 includes a serrated member 204 which has serrations along its outer diameter 206 and its inner diameter 208. This serrated member 204 is mounted on a pedestal 210. The outer serrations 204 matingly engage with serrations 212 formed on the interior wall of half member 192. A guide pin 214 extends from the mid-portion of button 198 in the direction of half member 194. Guide pin 214 is received within a slot 216 formed within a pedestal 218 which extends outwardly from half member 194. A biasing means 220 is received within a bore 222 in pin 214 and in a receiving bore 224 in pedestal 218. The biasing means 220 forces push button 198 to a normal locking position.

An adjustable disk 230 extends from the adjoining end of vertical adjusting member 144. Adjusting disk 230 is sandwiched between half members 192 and 194 of horizontal member 142. Adjusting disk 230 has serrations 232 about its outer diameter and is mounted to vertical member 144 by a mounting pedestal or flange 236. In the disclosed embodiment, flange 236 extends from a semi-circular surface 238 which mates with outer arcuate surface 239 of horizontal member 142. As seen in FIG. 1, surface 238 slides along mating arcuate surface 239 of the adjoining end of horizontal member 142 when the vertical member is pivoted. Disk 230 has an opening 234 which has an inner diameter which is substantially equal to the outer diameter of pedestal 218. In this way, adjusting disk 230 can pivot about pedestal 218 when vertical member 144 is pivoted. A recessed area 248 is provided in half member 194 for receipt of serrated member 204 of button 198. This area 248 is formed by raised surface 246.

In operation, button 198 is generally forced to its outer most position by biasing means 220. In this position, serrations 206 on serrated member 204 engage serrations 212 on half member 192. Further, serrations 208 on member 204 engage serrations 232 on disk 230. With all the serrations engaged, the horizontal and vertical members 142 and 144 are locked with respect to one another. In order to pivot vertical member 144 with respect to horizontal member 142, button 198 is depressed which forces serrated member 204 into recess 248 of half member 194 disengaging the serrations on disk 230 and half member 192. With the serrations disengaged, vertical member 144 is free to rotate about pedestal 218 to any angular relationship with respect to horizontal member 142. Once the desired angular relationship is obtained, button 198 is released reengaging all of the serrations and locking member 142 and 144 with respect to one another.

Figure 13:
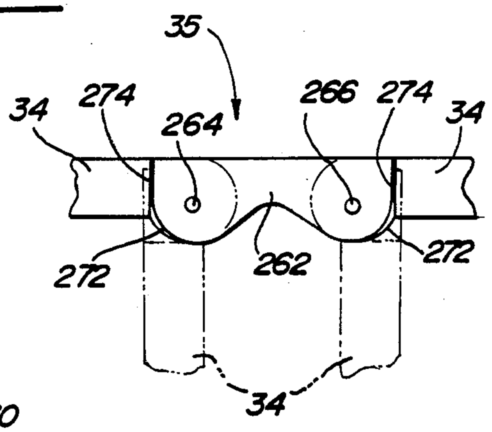
FIG. 13 is a fragmentary exploded view of the area indicated in FIG. 12.
Figure 12:
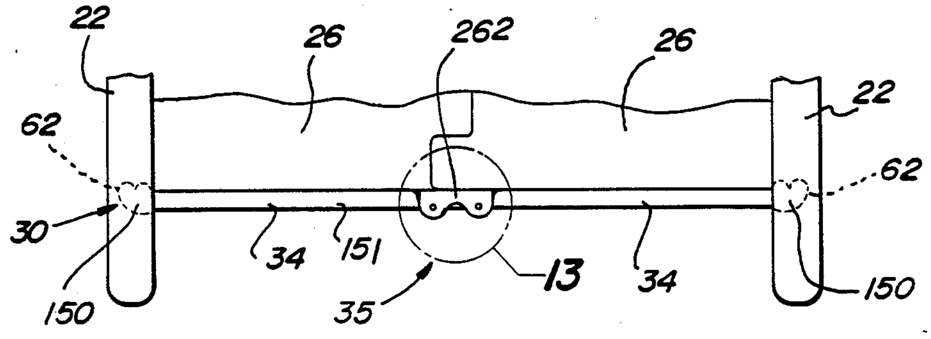
FIG. 12 is a fragmentary plan view taken along line 12—12 of FIG. 1 showing the back panels of the wheelchair.

With reference now to FIGS. 12 and 13, back 32 of wheelchair 10 will be described. As shown in FIG. 12, the outer edges of panels 34 of back 32 use unique hinge 30 of the present invention. The adjoining edges of panels 34 are interconnected by a dual hinge 35. This dual hinge includes a spine member 262 which has pivots 264 and 266 on opposite sides thereof. In the disclosed embodiment, these pivots are connecting rods which preferably are made of a non-metallic material such as glass. Referring to FIG. 1, it can be seen that the spine has a number of teeth which mate with corresponding teeth formed on panels 34. As with single hinge 28 of the seat portion, the back hinges have radiused edges 272 interconnected by flat surfaces 274 which provide further support in that they lock when fully extended. The dual hinge 35 provides a predetermined width to the folded wheelchair. This can be seen in FIG. 11. The folded inner width of the wheelchair is defined by the width of spine 262. In this way, seat panels 26 can be folded upwardly between the folded side panels to make a more compact narrower folded chair.

The wheelchair is made by molding the side panels with the slots for hinged members 32, wheels 38 and casters 40 being molded simultaneously. The slots for receipt of the hinge members are formed by several methods. One method uses plugs which are placed into the side panel during molding and then slid out of the side panel once molding is complete. With this method, the seat and back panels 26 and 32 can be slid into the slot and then a cap placed at the end of the slot to seal them in place. A further method of forming the slots in side panels 22 is to use an expandable insert. During the forming of side panel 22, the expandable insert is expanded to form the slot and then deflated and removed. If this method is used, hinge member 30 can be forced into the slot while the slot is still somewhat resilient. Once curing of panel 22 is complete, the hinged member is retained in its proper position. A still further method of forming the slots is to use hinge member 30 as the insert for forming the slot during the molding process. In this method, hinge member 30 must be treated with a heat resistive material, such as for example, polytetrafluoroethylene. In this method, hinge member 30 is inserted into the side panel during the molding process and when the side panel cures, the hinge is in place. As should be apparent, each of these methods facilitates the assembly of the wheelchair and reduces the amount of hours needed to assemble the wheelchair. Still further, since there are no exposed parts, maintenance of the wheelchair is greatly reduces if not entirely eliminated.

As previously discussed, wheels 38 and casters 40 are pressed into place with the mushroomed pins being retained within the T-slots in the panels. Lastly, the foot rest assembly is easily assembled since all the mechanisms are sandwiched between the side halves of horizontal member. All that is required is that each member be properly positioned and then the side members be joined such as for example, by an adhesive. Once joined, the horizontal members can be slid into the support track which have been formed in the panels during the molding process.

It should be appreciated that there has been provided in accordance with the present invention a preferred embodiment of the foldable wheelchair of the present invention. It is evident that many alternatives, modifications and variations will be apparent to those skilled in the art in light of the foregoing description. Accordingly, it is intended to embrace all such alternatives, modifications, and variations as fall within the spirit and broad scope of the appended claims. One such modification is the use of the unique hinge method for other applications other than wheelchairs. One such application would be for example, use of the hinge members to mount rungs of a ladder to the vertical supports of the ladder. Another alternative would be to use materials other than non-magnetic materials.

I claim:

1. A foldable chair, comprising:

a pair of normally spaced generally vertically oriented side panels, each of said side panels having an elongated generally horizontal slot therein;

a pair of seat panels, said seat panels each having a hinge portion extending along one edge thereof located within said horizontal slot of one of said side panels and an opposite edge;

said hinge portions of said seat panels each including a generally circular convex hinge surface and a locking surface means adjacent a free edge thereof located within said slot; and said side panel slots each having a circular concave socket receiving said generally circular convex hinge surface in pivotal relation and a locking socket receiving said hinge portion locking surface when said seat panels are pivoted about said hinge surface to a generally horizontal orientation, said locking surface means limiting further pivotal movement of said seat panels and supporting said seat panels in said generally horizontal orientation without requiring support for said seat panel at said opposite edges.

2. The foldable chair defined in claim 1, characterized in that said seat panel opposite edges are pivotally interconnected.

3. The foldable chair defined in claim 1, characterized in that said seat panel hinge portion locking surface is arcuate and adjacent said circular convex hinge surface, and said side panel slot locking surface means comprising an arcuate concave surface conforming to and receiving said arcuate seat panel locking surface.

4. The foldable chair defined in claim 3, characterized in that said seat panel hinge portions are integral with said seat panels and said hinge portions are generally heart-shaped in cross section, said heart-shaped hinge portions each including a semicircular convex hinge surface and an adjacent semicircular convex locking recess surface and said side panel slots each including a concave mating heart-shaped surface receiving said seat panel hinge portion.

5. The foldable chair defined in claim 1, characterized in that said foldable chair includes two generally vertical back panels, said back panels each including one edge pivotally connected to one of said side panels and an opposite edge, said back panel opposite edges pivotally interconnected to permit folding of said chair.

6. The foldable chair defined in claim 5, characterized in that said side panels each include a generally vertically extending elongated slot located above said seat panels and each of said back panels each including a hinge portion extending along one edge thereof located in said vertical slot of one of said side panels, each of said back panel hinge portions including a semicircular convex hinge surface and said side panel vertical slots each including a concave semicircular hinge surface adjacent the opening of said slot receiving said back panel hinge portion hinge surface and pivotally supporting said back panels.

7. The foldable chair defined in claim 6, characterized in that said back panel hinge portions further include an arcuate convex locking surface adjacent said hinge surface and said side panel vertical slot each including a concave arcuate locking surface receiving said back panel support locking surface and limiting relative movement of said back panels relative to said side panels.

8. The foldable chair defined in claim 5, characterized in that said foldable chair includes three back panels including an intermediate back panel having side edges pivotally connected to said two back panel opposite edges permitting said chair to be folded relatively flat.

9. The foldable chair defined in claim 5, characterized in that said foldable chair includes wheels each rotatably supported on one of said side panels and supporting said foldable chair.

10. A foldable wheelchair, comprising:

a pair of spaced generally vertical side panels, each of said panels having an elongated generally horizontal slot therein;

a pair of wheels each rotatably supported on one of said side panels rotatably supporting said side panels;

a pair of seat panels, said seat panels each having a hinge portion extending along one edge thereof located within said horizontal slot of one of said side panels and an opposite edge;

said hinge portions of said seat panels each including a semicircular convex hinge surface and a locking surface adjacent the distal edge of said seat panel located within said slot; and said side panel slots each having a semicircular concave socket adjacent the opening of said slot receiving said semicircular convex hinge surface of one of said seat panels in pivotal relation and a locking surface adjacent said semicircular socket receiving said hinge portion locking surfaces when said seat panels are pivoted about said hinge surfaces to a generally horizontal orientation, said locking surfaces of said slots limiting further pivotal movement of said seat panels and supporting said seat panels in said generally horizontal orientation without requiring additional support for said seat panel opposite edges.

11. The foldable wheelchair defined in claim 10, characterized in that said seat panel opposite edges are pivotally interconnected.

12. The foldable wheelchair defined in claim 10, characterized in that said seat panel hinge portions are each heart-shaped in cross section, including said semicircular convex hinge surface and an adjacent semicircular locking surface, and said slots each having a mating heart-shaped socket receiving said heart-shaped hinge portion in pivotal relation.

13. The foldable wheelchair defined in claim 10, characterized in that said side panels each include a generally vertically extending slot located above said seat panels and said wheelchair including at least two back panels each having a hinge portion located in said vertically extending slot of one of said side panels and said back panels pivotally interconnected to permit folding of said wheelchair.

14. The foldable wheelchair defined in claim 13, characterized in that said foldable wheelchair includes three back panels, including an intermediate back panel having side edges pivotally connected to said previously defined two back panels opposite edges permitting said chair to be folded relatively flat.

15. A method of making a wheelchair comprising the steps of:

(1) molding a pair of integral side panels with each panel including a first and second elongated slot substantially perpendicular to one another, each of said slots including a hinge recess, a locking recess and a bearing recess;

(2) molding a pair of seat and back panels with each of said panels having an integral hinge member at one end thereof including a hinge surface, locking surface and a bearing surface;

(3) inserting said hinge member of each of said panels of said pair of seat panels into respective first slots in each of said pair of side panels;

(4) inserting said hinge member of each of said panels of said pair of back panels into respective second slots in each of said pair of side panels;

(5) hingedly connecting the adjoining ends of said seat and back panels so that said wheelchair is foldable about said hinged adjoining ends and said hinged outer ends of said panels;

(6) mounting support wheels upon said side panels to support said wheelchair for mobile movement.

16. A method of making a wheelchair comprising the steps of:

(1) molding a pair of seat and back panels with each of said panels having an integral hinge member at one end thereof;

(2) coating said hinge members with a heat resistive coating;

(3) molding a pair of side panels;

(4) inserting said coated hinge members into said side panels to form complimentary elongated slots substantially parallel to one another and to integrally form a side panel with seat and back panels attached thereto;

(5) hingedly connecting the adjoining ends of said seat and back panels so that said wheelchair is foldable about said hinge adjoining ends and said hinged outer ends;

(6) mounting support wheels upon said side panels to support said wheelchair for mobile movement.

17. The method of claim 16, wherein said seat and back panels are molded to form said integral hinge members with a hinge surface, locking surface and bearing surface.

* * * * *